US008548266B2

(12) United States Patent
Wang

(10) Patent No.: US 8,548,266 B2
(45) Date of Patent: Oct. 1, 2013

(54) METHOD OF PERFORMING FAST COMPRESSION AND DECOMPRESSION FOR IMAGE WITH ACCELERATED STEPS

(75) Inventor: Jian Wang, Beijing (CN)

(73) Assignees: Peking University Founder Group Co., Ltd., Beijing (CN); Beijing Founder Electronics Co., Ltd., Beijing (CN); Peking University, Beijing (CN)

(*) Notice: Subject to any disclaimer, the term of this patent is extended or adjusted under 35 U.S.C. 154(b) by 1355 days.

(21) Appl. No.: 11/813,388

(22) PCT Filed: Dec. 23, 2005

(86) PCT No.: PCT/CN2005/002292
§ 371 (c)(1),
(2), (4) Date: Mar. 26, 2008

(87) PCT Pub. No.: WO2006/072206
PCT Pub. Date: Jul. 13, 2006

(65) Prior Publication Data
US 2009/0016629 A1      Jan. 15, 2009

(30) Foreign Application Priority Data
Jan. 7, 2005   (CN) .......................... 2005 1 0000589

(51) Int. Cl.
*G06K 9/36*      (2006.01)
(52) U.S. Cl.
USPC .......................................... 382/250; 382/299
(58) Field of Classification Search
USPC .......................................... 392/232, 250, 299
See application file for complete search history.

(56) References Cited

U.S. PATENT DOCUMENTS

| 5,371,611 | A | 12/1994 | Kato et al. |
| 5,719,961 | A | 2/1998 | Normile et al. |
| 6,160,918 | A * | 12/2000 | Pigeon .......................... 382/248 |
| 6,778,707 | B1 | 8/2004 | de Queiroz |
| 2003/0081674 | A1 * | 5/2003 | Malvar ..................... 375/240.03 |

FOREIGN PATENT DOCUMENTS

| EP | 0990992 A2 | 4/2000 |
| EP | 1109410 A2 | 6/2001 |
| JP | 7162861 A | 6/1995 |
| JP | 2001-145107 | * 5/2001 |
| JP | 2001145107 A | 5/2001 |

(Continued)

OTHER PUBLICATIONS

International Telecommunication Union, CCITT—The International Telegraph and Telephone Consultative Committee, "Terminal Equipment and Protocols for Telematic Services", Recommendation T.81 (Sep. 1992).

(Continued)

*Primary Examiner* — David Zarka
*Assistant Examiner* — Eueng-Nan Yeh
(74) *Attorney, Agent, or Firm* — The Webb Law Firm

(57) ABSTRACT

The present invention relates to an image compression and decompression method, in particular in the areas of computer image processing and data compression. The currently, the process speed for which JPEG (Joint Photographic Experts Group, a compression standard) is applied, it's not all too satisfactory. One aspect of the present invention is simplify compression process based on particular features of an image, thus achieve the aim of accelerate the processing speed. Apply the process described in the present invention, the processing speed for JPEG compression/decompression would rise, without suffers quality reduction compare to current JPEG compression/decompression method.

4 Claims, 4 Drawing Sheets

(56) References Cited

FOREIGN PATENT DOCUMENTS

| | | |
|---|---|---|
| JP | 2001177729 A | 6/2001 |
| JP | 2003179924 | 6/2003 |
| JP | 2003324739 | 11/2003 |
| KR | 2004066397 | 7/2004 |
| KR | 2004073790 | 8/2004 |
| WO | 03101121 | 4/2003 |

OTHER PUBLICATIONS

Independent JPEG Group; "JPEG Image Compression Library, Release Version 6B"; May 27, 1998; 30 pages; XP002507900.

Pennebaker et al.; "The Discrete Cosine Transform (DCT)"; JPEG Still Image Data Compression Standard, Jan. 1, 1992, pp. 29-64; New York, Van Nostrand Reinhold, US; XP002248710.

Wallace; "The JPEG Still Picture Compression Standard"; IEEE Transactions on Consumer Electronics, Feb. 1, 1992; pp. XVIII-XXXIV; vol. 38; No. 1; IEEE Service Center, New York, US; XP000297354.

Bik, Aart et al., "Efficient Exploitation of Parallelism on Pentium III and Pentium 4 Processor-Based Systems," Intel Technology Journal, Feb. 28, 2001, vol. 5, No. 1.

* cited by examiner

METHOD OF PERFORMING FAST COMPRESSION AND DECOMPRESSION FOR IMAGE WITH ACCELERATED STEPS

TECHNICAL FIELD

The present invention relates to computer image processing and data compression technology, in particular to a process of accelerated image compression and decompression.

BACKGROUND OF THE INVENTION

Joint Photographic Experts Group (JPEG) is a committee under International Standard Organization (ISO) responsible for setting up the static image compression formats international standard which is widely used in the areas of image storage and digital cameras. JPEG proposes a number of processes for image compression and decompression based on the discrete cosine transform (DCT) and the inverse discrete cosine transform (IDCT).

A known process of image compression based on the DCT comprises the following steps.

Step 1 is a pre-processing step by inputting image data. The purpose of this step is to pre-process the input data so as to make the input data match the following steps, or so as to achieve desirable compression result. This step comprises splitting an original image data into a plurality of 8×8 blocks, standardizing the pixels of the input image, and performing a color space transformation, etc.

Step 2 is to perform the DCT. The input of this step is 8×8 image data blocks, wherein all the values of pixels are standardized. The equation for the DCT is:

$$F(u, v) = \frac{1}{4} C(u) C(v) \sum \sum f(x, y) \cos \frac{\pi(2x+1)u}{16} \cos \frac{\pi(2y-1)v}{16}$$

wherein:
  u, v, x, y=0, 1, 2 ... 7;
  (x, y) represents the coordinate of a point within a block before the DCT, where (0,0) is the coordinate of the pixel on the top left corner of a block; f(x, y) is the value of the pixel at the coordinate (x, y) before the DCT; (u, v) is the coordinate of the pixel after the DCT; F(u, v) is the value of the pixel at the coordinate (u, v) after the DCT.
  as u, v=0, C(u), C(v)=1/sqrt(2), where sqrt means the square root calculation.

Step 3 is to perform quantization. The input of this step is the data block after the DCT and a designated quantization matrix. All elements in the quantization matrix are non-zero positive integrals. Assuming that the quantization matrix is Q(x, y), the quantization is conducted according to the following equation:

$F(x, y)=[F(x, y)/Q(x, y)+0.5]$ where x, y=0, 1, 2 ... 7, [ ] means the result would be round off to an integral, and adding 0.5 is to help with the rounding off.

Step 4 is to perform one dimensional prediction of a direct current (DC) coefficient. F (0, 0) is called as a DC coefficient and the other elements are known as Alternating Current (AC) coefficients. To process the DC coefficient, assuming P is the DC coefficient of a preceding image block, which is also the prediction value of the current DC coefficient, the equation for prediction is shown as below:

$F(0, 0)=F(0, 0)-P$; //the value of DC coefficient after prediction

The predicted value of the DC coefficient for the next image block becomes:
P=P+F (0, 0); //the value of DC coefficient predicted for the next image block.

Step 5 is to perform DC Entropy coding. The input of this step is the DC coefficient in the matrix which is the output of step 4. The black element on the top left corner of FIG. 2 represents the DC coefficient.

Step 6 is to perform an AC Entropy coding, the input of which are the AC coefficients in the outputting matrix of step 4, wherein AC coefficients are arranged in "zigzag" order and a run-length encoding algorithm for entropy coding is employed, referring to FIG. 2. Besides the black element on the top left corner of the data block, the rest of elements in FIG. 2 are AC coefficients. The bending line indicates AC coefficients being encoded in a zigzag manner. FIG. 3 is flow chart for showing the AC coefficient entropy run length coding process.

Decompression based on the IDCT, which is the reverse of the compression, is described below.
  Step 1 is to perform DC coefficient entropy decoding.
  Step 2 is to perform AC coefficients entropy decoding.
  Step 3 is to perform one dimensional inverse prediction of the DC coefficient according to the following equation:

$P=F(0, 0)=F(0,0)+P$.

Step 4 is to perform the inverse quantization process according to the following equation:

$F(x, y)=F(x, y)Q(x, y)$.

Step 5 is to perform the IDCT according to the following equation:

$$f(x, y) = \frac{1}{4} \sum \sum C(u)C(v)F(u, v)\cos\frac{\pi(2x+1)u}{16} \cos \frac{\pi(2y+1)v}{16}.$$

Step 6 is a post-processing step, which is a reverse of the pre-processing.

FIG. 1 shows a flowchart of JPEG compression/decompression process based on the DCT and the IDCT. Details of JPEG is disclosed by the International Telegraph and Telephone Consultative Committee (CCITT) in the document with reference number CCITT Rec.T.81(1992E) with the title "Information Technology-Digital Compression and Coding of Continuous-Tone Still Images-Requirement and Guideline".

Currently, the JPEG compression process based on the DCT is able to provide an acceptable compression rate. Moreover, when a compressed image is decompressed, the difference between the original image and the decompressed one is hard to be detectable visually. But, its processing speed is not good. It is obvious from the equations for the DCT and the IDCT that a heavy load of calculation is required. Although a lot of accelerated processes are proposed to reduce the work load of calculation, those known accelerated processes cannot be applied to process those images with high resolution. And, the processing speed is still one major obstacle for JPEG applications.

SUMMARY OF THE INVENTION

In order to overcome the shortcomings in the prior art, the objective of present invention is to increase the processing speed of JPEG compression/decompression process based on the DCT and the IDCT without impacting the quality of the image.

To achieve above mentioned objective, one aspect of present invention is to provide a process for image data compression, comprising the following steps:

step 1 is to pre-process an input image, comprising splitting an original image data into a plurality of image data blocks, standardizing pixels of the image, and performing a color space transformation;

step 2 is to determine whether a given data block satisfies a requirement for an accelerated compression, wherein, if yes, step 3 is carried out, otherwise step 4 is carried out; and wherein the requirement is satisfied when all pixel values in one image block are equal;

step 3 is to perform a simplified DCT on the image data block and go to step 5;

step 4 is to perform a DCT on the image data block;

step 5 is to quantify a resulting data block after its DCT;

step 6 is to perform one dimensional prediction on a DC coefficient of the data block;

step 7 is to perform DC entropy coding on the DC coefficient of the data block; and step 8 is to perform AC entropy coding on AC coefficients of the data block, and end the process.

Further, to improve the compression process, the determination of the above step 2 could be further improved by combing a number of image data into a "unit" for comparison, rather than one image datum at one time.

Further, if the requirement is satisfied, the DCT and the quantization are merged to form a simple DCT-quantization process, the DC entropy coding and the AC entropy coding are merged to form a simple entropy coding process, a preferred workflow for accelerated compression is listed below:

step 1 is to pre-process the inputted image;

step 2 is to determine whether the given data block satisfies the requirement, if yes, step 8 is carried out, otherwise step 4 is carried out, wherein the requirement is satisfied when all pixel values in an image block are equal;

step 3 is to perform the DCT on the image data block;

step 4 is to quantify the resulting data block after its DCT;

step 5 is to perform one dimensional prediction on the DC coefficient of the data block;

step 6 is to perform the DC entropy coding on the DC coefficient of the data block;

step 7 is to perform the AC entropy coding on the AC coefficients of the data block;

step 8 is to perform the simplified DCT-quantization process;

step 9 is to perform one dimensional prediction on the DC coefficient of the data block; and step 10 is to perform the simple entropy coding, and end the process.

The present invention also provides a process for image data decompression, comprising the following steps:

step 1 is to input a compressed image data block, performing a DC coefficient entropy decoding on the image data block;

step 2 is to perform a AC coefficients entropy decoding;

step 3 is to perform one dimensional inverse prediction on a DC coefficient of the image data block;

step 4 is to perform a inverse quantization on a quantified image data block;

step 5 is to determine whether a given image data block satisfies a first requirement of an accelerated decoding process, if yes, step 6 is carried out, otherwise, step 7 is carried out, wherein the first requirement is that all the AC coefficients in the given image data block equals to zero;

step 6 is to perform a simplified DCT, then step 8 is carried out;

step 7 is to perform a DCT; and step 8 is to post-process the image data and output image data that have been decompressed.

Further, to improve the decompression process, the step 5 in the decompression process is farther improved by combining a number of image data into a "unit", and performing a comparison in view of the unit, rather than one datum by one datum.

Still further, when the image data is decompressed, a start point of the accelerated process is forwarded, and wherein if a second requirement for the accelerated decompression is satisfied, the AC entropy decoding process is omitted, and the inverse quantization and DCT process both are simplified, wherein a preferred workflow for the accelerated decompression is listed below:

step 1 is to perform DC entropy decoding on the DC coefficients in the image data block.

step 2 is to determine whether the image data block satisfies a second requirement for the accelerated decompression process, if yes, step 7 is carried out, otherwise step 3 is carried out, wherein the second requirement is that a first coded AC coefficient is an end code such as End of Block;

step 3 is to perform the entropy decoding on the AC coefficients in the image data block;

step 4 is to perform one dimensional inverse prediction on the DC coefficient in the image data block;

step 5 is to perform the inverse quantization;

step 6 is to perform an IDCT, and go to step 9 after the IDCT is completed;

step 7 is to perform one dimensional inverse prediction on the DC coefficient in the image data block;

step 8 is to perform a simple IDCT-inverse quantization process; and step 9 is to post-process the image data and output a decompressed image data.

The present invention could accelerate the processing speed of JPEG compression/decompression based on the DCT and the IDCT, without impacting the quality of an image and without increasing the time length for the process.

DETAILED DESCRIPTION

The invention will be now described herein with reference to embodiments and drawings.

Figure 1:
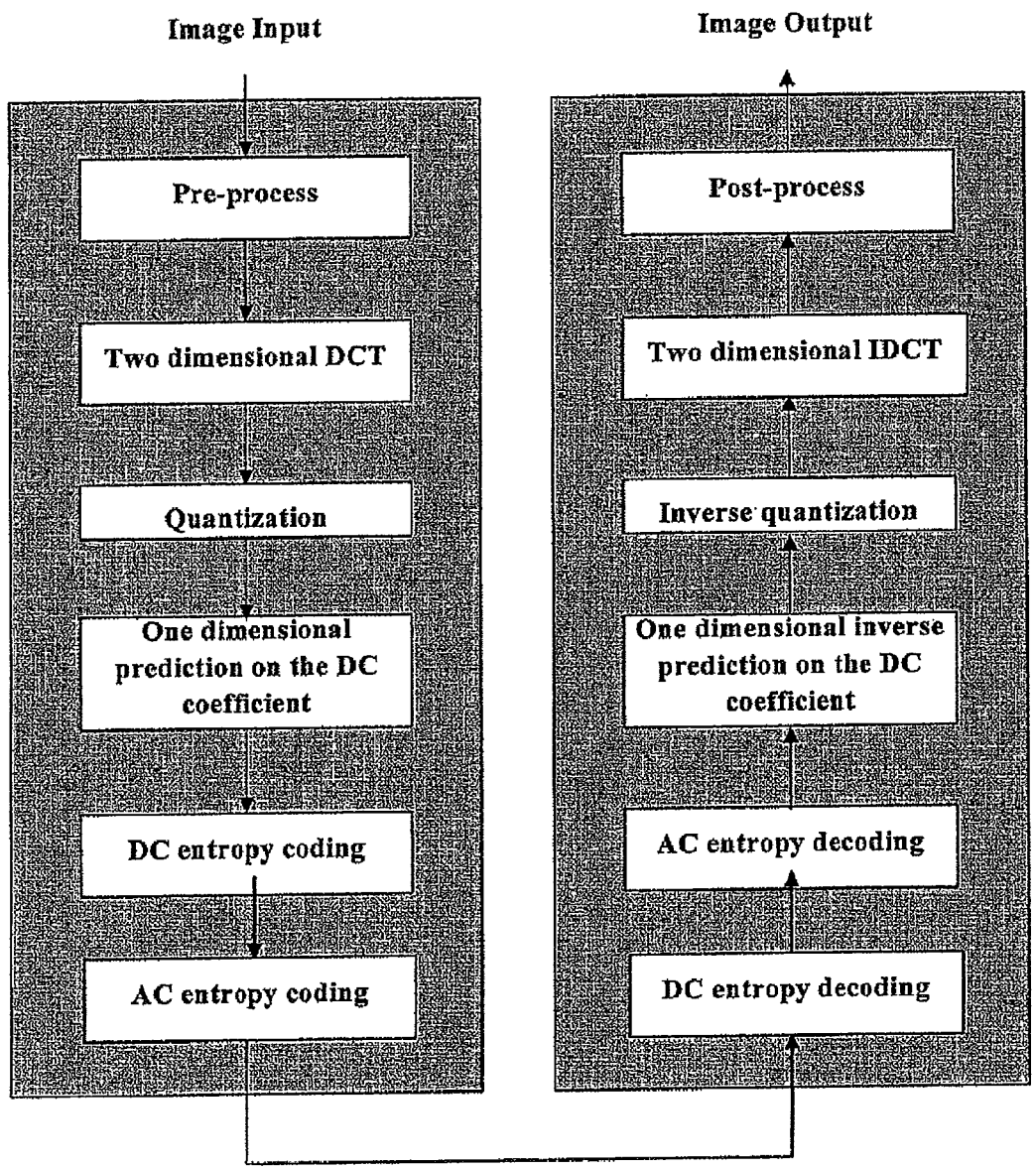
FIG. 1 is a flow chart for a typical JPEG compression/decompression process based on the DCT and the IDCT.
Figure 2:
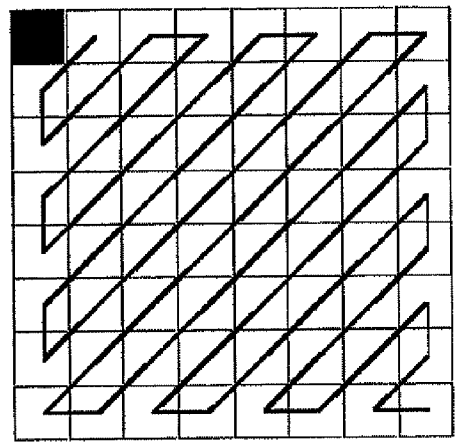
FIG. 2 is a layout view for the zigzag AC coefficients.
Figure 3:
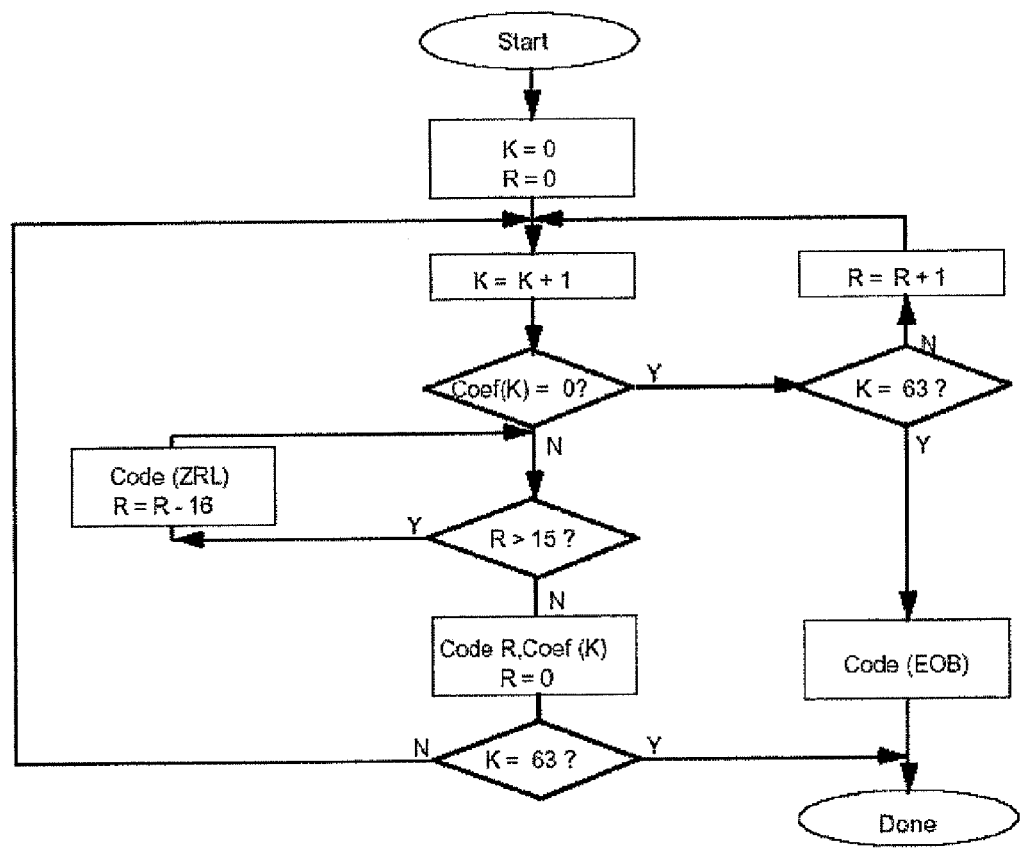
FIG. 3 is a flow chart for AC coefficients entropy run length coding.
Figure 4:
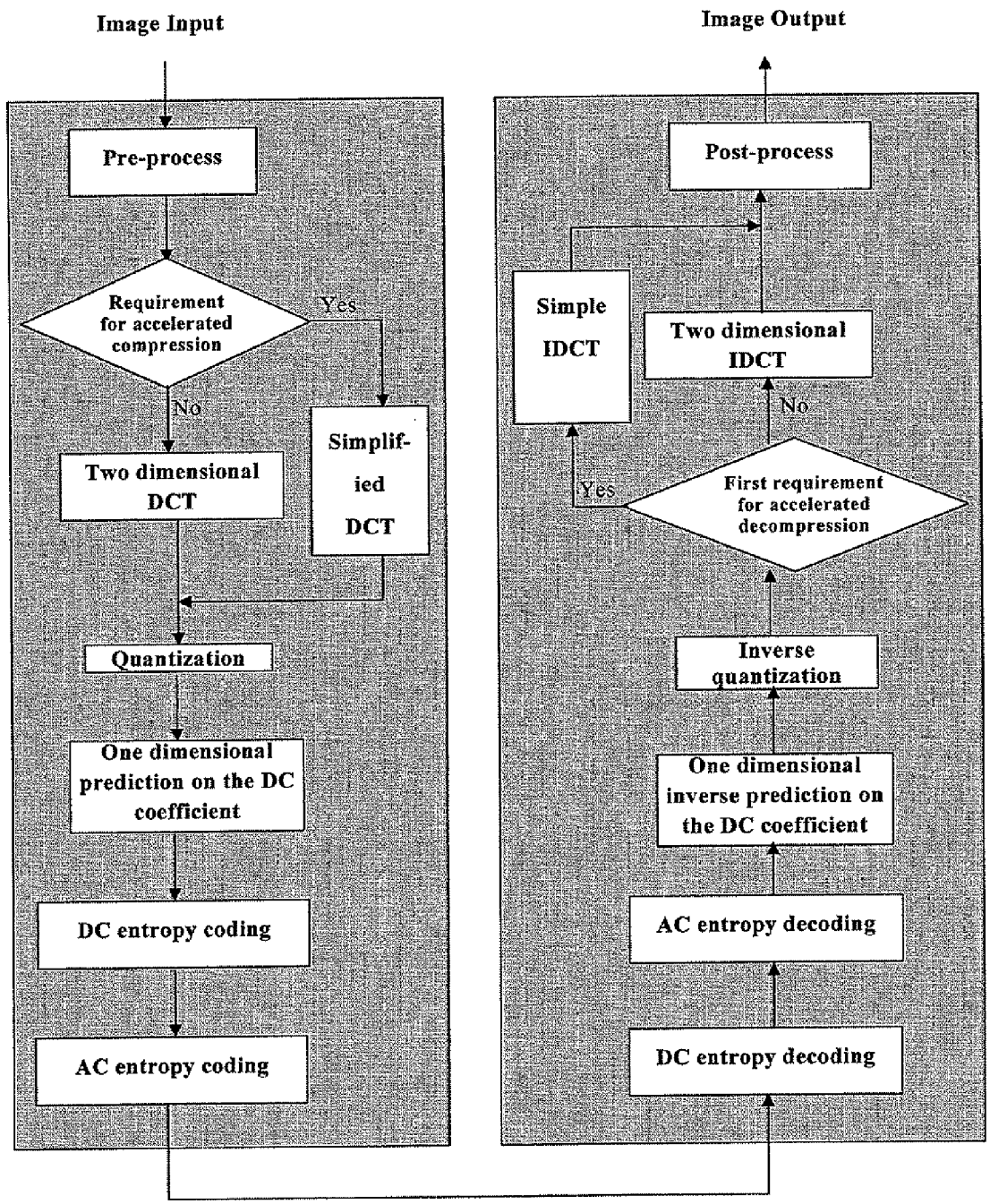
FIG. 4 is a work chart of an accelerated JPEG compression/decompression process.
Figure 5:
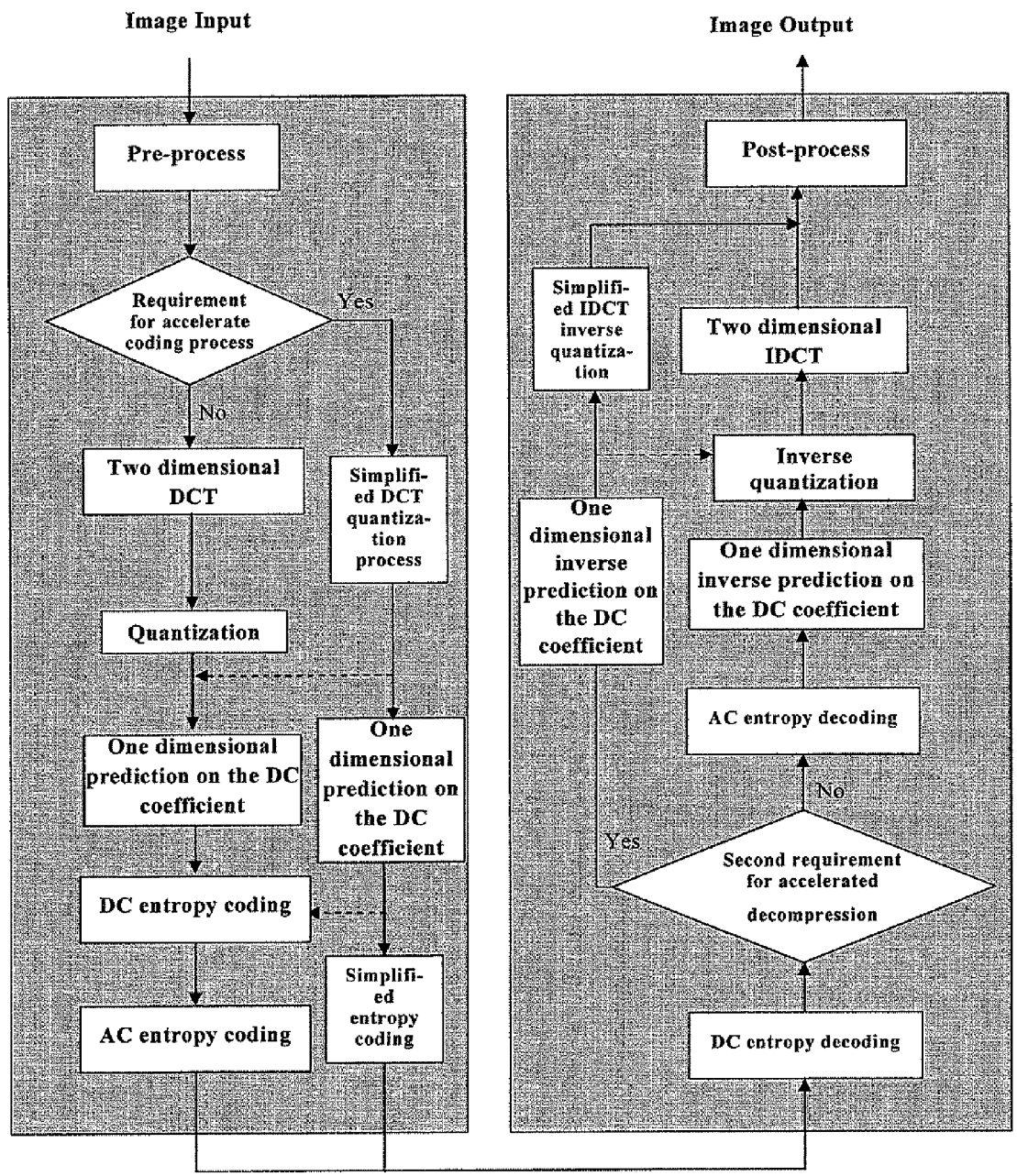
FIG. 5 shows a flow chart of a preferable accelerated JPEG compression/decompression process.

FIGS. 4 and 5 show a basic accelerated JPEG compression process based on the DCT.

Specifically, step 1 is to pre-process an input image, including splitting the input image data into a plurality of image data blocks, standardizing values of pixels of the image, and conducting a color space transformation.

Step 2 is to determine whether a given image block satisfies with the requirement for accelerated compression. If yes, the procedure goes to step 3, otherwise, goes to step 4. The input of this step is a plurality of 8×8 image data blocks. And, all the values of pixels have been standardized, The mentioned requirement is that all the values of pixels in one image block are equal. JPEG can process both 8 bits and 12 bits of pixel depths according to the following pseudo-codes:

```
For 8 bits pixel depth:
    for (int n=1; n<64; n++)
        if(f[0]!=f[n])      return false;
    return true;
```

In the worst case, the above needs 63 comparisons.
For 12 bits pixel depth:

```
int tmp=read_bit(f,12); // read 12 bits from the data stream
    for (int n=1; n<64; n++)
        if (read(f,12)!=tmp)      return false;
    return true;
``` wherein f represents a data stream. The worst case for the above operation is to perform 64 iterations and 63 comparisons. The return value "true" means the satisfaction of the requirement, while the return value "false" means the dissatisfaction of the requirement.

Step 3 is to perform a simplified DCT and proceed to step 5 after completing the transformation.
  An equation for performing a simplified DCT is listed below: assuming f(x, y) is a matrix before the DCT, F(x, y) is a matrix after the IDCT, where x, y=0, 1, 2 . . . 7, For $x, y=0$, $F(x, y)=f(0, 0)\times 8$;

For $x\ne 0$ or $y\ne 0$, $F(x, y)=0$.

Step 4 is to perform the DCT as mentioned in the Background.
Step 5 is to perform the quantization process as mentioned in the BACKGROUND
Step 6 is to perform one dimensional prediction on a DC coefficient as mentioned in the Background.
Step 7 is to perform the DC coefficient entropy coding as mentioned in the Background.
Step 8 is to perform AC coefficients entropy coding as mentioned in the Background.
Above process is shown in FIG. 4.

To achieve a better result than the prior art, step 2 of the present embodiment further comprises a step of combining a number of data to form a large "unit" and perform comparison in view of the unit, rather than performing the comparison one datum by one datum.

In view of the requirement of accelerated compression process of step 2, the following pseudo-code provides a quicker determination than the basic process:

```
unsigned int*p = (unsigned int*)f;
    unsigned int temp = circle_left_shift(p[0],8); // circle to the left by
shifting 8 bits (of course, it would work as well if shifting to the right by
8 bits);
    for ( int n = 0; n<64/sizeof(int); n++)
        if(temp ! = p[n])      return false
    return true;
```

It is provable that the above is equivalent to step 2 of the basic accelerated compression process. For the majority of 32-bit CPU currently in use, even in the worst scenario, it only needs one circle shift operation and 16 comparisons. At the worst case, the time-consumption of the above is ¼ of that of step 2 of the basic process. To those CUPs with 64 or 128 bits of registers (i.e. Intel CUP with MMX), the time-consumption of the above would only be ⅛ or 1/16 in comparing with step 2 of the basic process.

In the condition of satisfaction of the requirement of accelerated compression, the optimization is not limited to the DCT. The step of performing the quantization and the step of performing entropy coding may be also optimized, too. A preferred accelerated compression process is shown as below:
  step 1 is to pre-process, which is conducted identically to the step of pre-processing in the background portion;
  step 2 is to determine whether a given image data block satisfies with a requirement of the accelerated compression. If yes, the procedure goes to step 8, otherwise to step 3; wherein the said requirement of accelerated compression is the same as the requirement mentioned in step 2 of the basic process. The determination of satisfaction of the requirement could be done according to the above step 2 as well as the improved step 2;
  step 3 is to perform the DCT as mentioned in the background portion;
  step 4 is to perform the quantization process as mentioned in the background portion;
  step 5 is to perform one dimensional prediction one DC coefficient as mentioned in the background portion;
  step 6 is to perform DC coefficient entropy coding as mentioned in the background portion;
  step 7 is to perform AC coefficients entropy coding as mentioned in the background portion;
  step 8 is to perform a simplified DCT-quantization process, wherein
    assuming F is a matrix before the process, f represents a matrix after the transformation, Q is a quantization matrix $F(0, 0)=f(0, 0)*(8/Q(0, 0))$;

since (8/Q(0, 0) is actually a constant, this step conducts once only;
  step 9 is to perform one dimensional prediction on the DC coefficient as mentioned in the background portion; and
  step 10 is to simplify the entropy coding and ending the procedure, wherein
  the entropy coding only needs to perform twice as below:

```
DC_code (F(0, 0));       //DC entropy coding for DC coefficient after
prediction
    AC_code(EOB);        //code word for ending the encoding.
```

FIG. 5 shows the compression process in detail. It is noted that there are dash lines in FIG. 5, which represents that the above procedure could return to the process as mentioned in the background portion at any appropriate time. This is regarded as a variation of the accelerated compression process of the present invention.

For the JPEG decompression process based on the IDCT, a basic accelerated decompression process is given as follows:
  step 1 is to perform a DC coefficient decoding as mentioned in the background;
  step 2 is to perform AC coefficients decoding as mentioned in the background;

step 3 is to perform one dimensional DC coefficient inverse prediction as mentioned in the background;
step 4 is to perform the inverse quantization as mentioned in the background;
step 5 is to determine whether a given image block satisfies with the first requirement of accelerated decompression. If yes, the procedure goes to step 6, otherwise to step 7; wherein the input of this step is a data block of 64 bits including AC and DC coefficients; the first requirement is that all AC coefficients in the input data block equals to zero. The following is the pseudo-code that determines whether the first requirement of accelerated decompression is satisfied. Assuming that F is the inputted data block,

```
for ( int n =1 ; n<64; n++)
    if(F[n]!=0)
        return false;     //the requirement is not satisfied
    return true           //the requirement is satisfied
in the worst case, 63 iterations in above pseudo-code are needed;
``` step 6 is to perform a simplified the IDCT and then proceeding to step 8, wherein the performing is conducted according to an equation as follows: assume F(x,y) represents a matrix before the IDCT, and f(x, y) represents a matrix after the IDCT, where x, y=0, 1, 2 . . . 7, $$f(x, y)=F(0, 0)/8, \text{ for } x, y=0, 1, 2 \ldots 7;$$

step 7 is to perform the IDCT as mentioned in the background; and
step 8 is to perform the post-processing as mentioned in the background.
The detailed process is shown in FIG. 4.
In order to achieve a better result than the prior art, step 5 of the present embodiment could be improved by further comprising a step of combining a number of data to form a lager "unit" and perform the comparison thereof, rather than performing the comparison one datum by one datum.
In view of step 5 of the present embodiment (the first requirement of accelerated decompression process), the following pseudo-code provides a quicker determination than the basic process:

```
unsigned int temp = F[0];        // storing DC coefficient
F[0]=0;                           //clearing DC coefficient
unsigned int*p = (unsigned int*)(&F[0]);
for (int n=0, n<64*sizeof(short)/sizeof(int); n++)
    if(p[n]!=0)
        {
            F[0]=temp;
            Return false;        //the requirement is not satisfied
        }
    F[0] = temp;
    Return true;                 //the requirement is satisfied
```

It is provable that the above is equivalent to step 5 of the basic accelerated compression process. For the majority of 32-bit CPUs currently in use, even in the worst case, the time-consumption of the above is ½ of that of the counterpart of the basic process. To CPUs with 64 or 128 bits registers (i.e. Intel CUP with MMX), the time-consumption would be ¼ or ⅛ in comparing with the step 5 of the basic process.
Although step 5 of the basic accelerated decompression process is optimized already according to the invention, the other steps of the basic process may be optimized, too, in a condition of satisfaction of the second requirement of accelerated decompression.
A preferable accelerated decompression process is shown as follows:
step 1 is to perform DC coefficient entropy decoding as mentioned in the background;
step 2 is to determine whether a given image data block satisfies with the second requirement of accelerated decompression, and if yes, the procedure goes to step 7, otherwise, goes to step 3; wherein the second requirement is that the first AC coefficients entropy coding is the flag of end of the block with the following pseudo-code:

```
R = DECODE ( );      //decoding the first encoded AC coefficient
if( R == EOB)        //checking if it is the flag of end of the block
    return true;     // the requirement is satisfied
    return false;    // the requirement is not satisfied
``` it is noted that, when the second requirement is satisfied, the AC coefficients entropy decoding will be omitted;
step 3 is to perform AC coefficients entropy decoding as mentioned in the background;
step 4 is to perform one dimensional inverse DC coefficient prediction as mentioned in the background;
step 5 is to perform the inverse quantization as mentioned in the background;
step 6 is to perform the IDCT and then proceed to step 9 as mentioned in the background;
step 7 is to perform one dimensional DC coefficient inverse prediction as mentioned in the background;
step 8 is to perform a simplified the IDCT-quantization process, wherein, assuming that F represents a matrix before the transformation, f represents a matrix after the transformation, and Q represents a quantization matrix, $$F(x, y)=F(0, 0)*(Q(0, 0)/8), \text{ for } x, y=0, 1, 2 \ldots 7.$$

Note Q(0, 0) is a constant; and
step 9 is to perform the post-processing as mentioned in the background.
Please refer to the decompression section of FIG. 5 for details. It is noted that dash lines occur in FIG. 5, which represents that the procedure could return to the process as mentioned in the background at an appropriate timing. It is regarded as a variation of the accelerated decompression process of the present invention.

The invention claimed is:
1. A process for image data compression, comprising the following steps:
step 1 is to pre-process an input image, comprising splitting an original image data into a plurality of image data blocks, standardizing pixels of the image, and performing a color space transformation;
step 2 is to determine whether a given data block satisfies a requirement for an accelerated compression, wherein, if yes, step 3 is carried out, otherwise step 4 is carried out; and wherein the requirement is satisfied when all pixel values in one image block are equal;
step 3 is to perform a simplified DCT on the image data block and go to step 5;
step 4 is to perform a DCT on the image data block;
step 5 is to quantify a resulting data block after its DCT;
step 6 is to perform one dimensional prediction on a DC coefficient of the data block;

step 7 is to perform DC entropy coding on the DC coefficient of the data block; and step 8 is to perform AC entropy coding on AC coefficients of the data block, and end the process, wherein the determination process in step 2 further comprises:

dividing the image data in the given data block into a plurality of units, each of the units comprising a plurality of image data;

shifting the image data in one unit in a circular manner to the left or right for one byte to form a new unit; and determining whether each original unit is equal to the new unit by comparing the image data therein, if yes, the requirement for an accelerated compression is satisfied, otherwise, the requirement for an accelerated compression is not satisfied.

2. The process for image data compression according to claim 1, wherein if the requirement is satisfied, the step of performing the DCT and the step for quantifying are merged to one step of performing a simplified DCT-quantization process; and the step of performing the DC entropy coding and performing the AC entropy coding are merged to form a simplified entropy coding, a preferred workflow for accelerated compression is listed below:

step 1 is to pre-process the inputted image;

step 2 is to determine whether the given data block satisfies the requirement, if yes, step 8 is carried out, otherwise step 3 is carried out, wherein the requirement is satisfied when all pixel values in an image block are equal;

step 3 is to perform the DCT on the image data block;

step 4 is to quantify the resulting data block after its DCT;

step 5 is to perform one dimensional prediction on the DC coefficient of the data block;

step 6 is to perform the DC entropy coding on the DC coefficient of the data block;

step 7 is to perform the AC entropy coding on the AC coefficients of the data block, and end the process;

step 8 is to perform the simplified DCT-quantization process;

step 9 is to perform one dimensional prediction on the DC coefficient of the data block; and step 10 is to perform the simple entropy coding, and end the process.

3. A process for image data decompression, comprising the following steps:

step 1 is to input a compressed image data block, performing a DC coefficient entropy decoding on the image data block;

step 2 is to perform a AC coefficients entropy decoding;

step 3 is to perform one dimensional inverse prediction on a DC coefficient of the image data block;

step 4 is to perform an inverse quantization on a quantified image data block;

step 5 is to determine whether a given image data block satisfies a first requirement of an accelerated decoding process, if yes, step 6 is carried out, otherwise, step 7 is carried out, wherein the first requirement is that all the AC coefficients in the given image data block equals to zero;

step 6 is to perform a simplified IDCT, then step 8 is carried out;

step 7 is to perform a IDCT; and step 8 is to post-process the image data and output image data that have been decompressed, wherein the determination process in step 5 further comprises:

clearing the DC coefficient in the given image data block;

dividing the image data in the given data block in which the DC coefficient is cleared into a plurality of units, each of the units comprising a plurality of image data;

determining whether each unit is equal to zero, if yes, the first requirement of an accelerated decoding process is satisfied, otherwise, the first requirement of an accelerated decoding process is not satisfied.

4. The process for image data decompression according to claim 3, wherein when the image data is decompressed, a start point of the accelerated process is forwarded, and wherein if a second requirement for the accelerated decompression is satisfied, the AC entropy decoding process is omitted, and the inverse quantization and DCT process both are simplified, wherein a preferred workflow for the accelerated decompression is listed below:

step 1 is to perform DC entropy decoding on the DC coefficients in the image data block.

step 2 is to determine whether the image data block satisfies a second requirement for the accelerated decompression process, if yes, step 7 is carried out, otherwise step 3 is carried out, wherein the second requirement is that a first coded AC coefficient is an end code such as End of Block;

step 3 is to perform the entropy decoding on the AC coefficients in the image data block;

step 4 is to perform one dimensional inverse prediction on the DC coefficient in the image data block;

step 5 is to perform the inverse quantization;

step 6 is to perform an IDCT, and go to step 9 after the IDCT is completed;

step 7 is to perform one dimensional inverse prediction on the DC coefficient in the image data block;

step 8 is to perform a simple IDCT-inverse quantization process; and step 9 is to post-process the image data and out-put a decompressed image data.

* * * * *

UNITED STATES PATENT AND TRADEMARK OFFICE
CERTIFICATE OF CORRECTION

PATENT NO.       : 8,548,266 B2                                                    Page 1 of 1
APPLICATION NO. : 11/813388
DATED            : October 1, 2013
INVENTOR(S)      : Jian Wang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1694 days.

Signed and Sealed this
Fifteenth Day of September, 2015

Michelle K. Lee
*Director of the United States Patent and Trademark Office*